F. SCHUBERT.
SOUNDING APPARATUS.
APPLICATION FILED JAN. 28, 1910.

987,260.

Patented Mar. 21, 1911.

WITNESSES:
Edgar M. Greenbaum
Jas. W. Sterett

INVENTOR
Frederick Schubert

ATTORNEY

UNITED STATES PATENT OFFICE.

FREDERICK SCHUBERT, OF SELLERSVILLE, PENNSYLVANIA.

SOUNDING APPARATUS.

987,260.  Specification of Letters Patent.  Patented Mar. 21, 1911.

Application filed January 28, 1910. Serial No. 540,497.

*To all whom it may concern:*

Be it known that I, FREDERICK SCHUBERT, a citizen of the United States, and resident of Sellersville, in the county of Bucks and State of Pennsylvania, have invented certain new and useful Improvements in Sounding Apparatus, of which the following is a specification.

My invention relates to sounding apparatus of the kind lowered into the water, the pressure being indicated by a pointer and a dial which shows the vertical depth to which the apparatus has been lowered and also when the bottom has been touched, the object being to produce a simple device which will lock the movement when the bottom has been reached and hold the said pointer in such locked position until released by hand.

My invention is shown in the accompanying drawing, in which—

Figure 1:
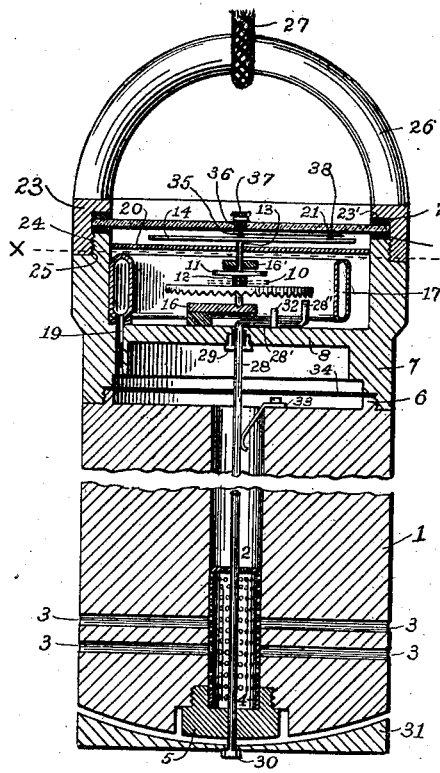
Figure 2:
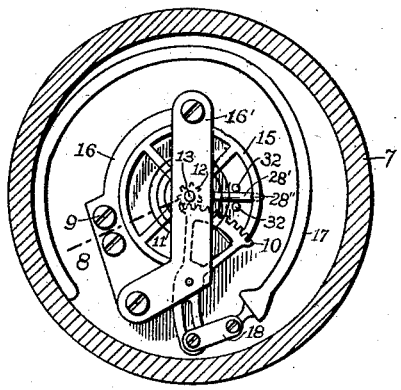
Figure 3:
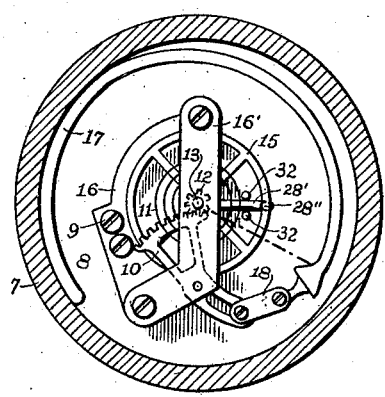

Figure 1 is a central sectional elevation; Fig. 2 a cross section taken on line x—x of Fig. 1—the dial and indicator being removed for clearness of illustration; the movement being at zero or in normal position—and Fig. 3 is same as Fig. 2 except that the Bourdon tube spring is distended and the movement is locked. The dash and dot lines in Figs. 2 and 3 represent the indicator or pointer.

The body, 1, of the apparatus is preferably of cast metal. A central opening, 2, extends longitudinally through the body, a series of radial openings, 3, being provided near the base and communicating with the said central opening; a perforated cylindrical strainer, 4, is fastened to a cap, 5, which closes the lower opening; an annular flange, 6, threaded externally affords a means of attaching the body to the movement case, 7, the movement frame, 16, being fastened to the bottom, 8, by screws, 9, or by other suitable means.

The movement consists of the usual sector, 10, spiral spring, 11, pinion, 12, on a shaft 13, surmounted by the indicator 14. A wheel 15, similar to a crown gear wheel, is mounted on the shaft 13, the shaft resting on the movement frame 16 at the bottom and having a bearing in the upper frame 16' through which it passes.

The Bourdon tube spring, 17, is connected with the free end of the sector by an adjustable link 18; the opening 19, through the bottom of the movement casing communicates with the interior of the Bourdon tube spring. The dial is shown at 20; the glass, 21, is placed between two suitable waterproof washers, 22 and 22', above and below, to make the interior of the movement case watertight; an annular flange, 23, provided with a shoulder, 23' has an internal thread, 24, adapted to engage the thread, 25, on the movement case as shown.

The bail, 26, is an integral part of the flange, 23; a rope, 27, is fastened to this bail for lowering the apparatus into the sea.

The locking device is described as follows:—A rod, 28, having an offset 28' and an upward extension 28" extends centrally through the opening 2 of the body 1 from the movement case through a stuffing box, 29, in the bottom of said case, to and a short distance through the cap, 5, where said rod is fastened by a screw thread and nut, 30, or other means to a disk 31 of any suitable metal or material, having the same diameter as the body, and mounted upon the rod so that a space of say about $\frac{1}{8}''$ is left between the said disk and the body. The offset 28' is prevented from turning by two pins, 32, on either side of it, the extreme end of the extension 28" being wedge shaped or flattened so as to engage between the teeth of the wheel 15, when the disk and rod is pushed up. A friction spring 33 may be used if desired. A disk strainer, 34, is placed between the body, 1, and movement case, 7, being held in the joint formed by these two parts.

A maximum hand, 35, may be used if desired by passing a stud, 36, through the glass, upon which stud the said hand is mounted, the stud passing through a stuffing box. A thumb piece, 37, is fastened on the stud. The maximum hand is carried forward by the pin, 38, on the indicator, 14, the general arrangement of this maximum hand being the same as is sometimes used on steam and other gages.

The length of the entire sounding apparatus is one foot over all, the dial being divided off into feet or fathoms, calculated by the depth pressure of the water acting upon the Bourdon tube spring.

Such being the construction, the operation is as follows: To take a sounding for bottom, the apparatus in a normal state (as shown in Figs. 1 and 2) is lowered into the sea and as the water enters through the several openings, the depth pressure causes the Bourdon-tube spring to extend—as usual by pressure, and as the depth increases the said tube spring and movement connected therewith continues to be actuated until bottom has been reached at which point the disk 31, and rod 28, are pushed upward, the extension 28″ engaging the teeth in the wheel 15 whereby the movement is locked. The spring 33 has just sufficient tension to hold the locking device against accidental displacement and prevents the disk 31 from unlocking the indicating mechanism when the apparatus is raised after taking a sounding. The apparatus is drawn up to the surface, the indicated depth is taken, when the disk and rod are pulled down and the movement released and brought to zero by the Bourdon-tube and the spiral spring, the apparatus then being ready for another sounding.

If a maximum indication is desired, the operation is exactly the same as hereinbefore described except that if the bottom has not been reached and the apparatus is withdrawn to the surface, the movement, not being locked will be actuated backward as the pressure decreases, but the maximum hand will indicate the depth to which the apparatus has been lowered without touching bottom.

I prefer not to use a maximum hand where accurate reading is required and where an approximate depth is known, for the reason that the sensitive adjustment of the spring and movement is liable to be affected by the retardation incident to the mounting of the maximum hand.

It is evident from the foregoing description that the water freely enters and leaves the apparatus, and that there is an absence of valves or similar devices upon the operation of which correct measurement depends.

What I claim as new is:—

1. In a sounding apparatus, a body having a central longitudinal opening and a series of radial openings communicating with said longitudinal opening, a water tight case surmounting said body, a Bourdon-tube spring mounted in said watertight case and communicating with said longitudinal opening by a passage through said water tight case, a movement connecting with the free end of said Bourdon-tube spring, and a sliding means for locking said movement to indicate the depth reached when the apparatus touches bottom.

2. In a sounding apparatus a body provided with openings communicating with a Bourdon-tube spring, a Bourdon-tube spring, a movement connected with said spring, a movable disk below said body, a sliding rod provided with an arm, said rod connecting said disk with said arm for locking or releasing said movement when said disk is actuated.

3. In a sounding apparatus, a body provided with openings communicating with a Bourdon-tube spring, a Bourdon tube spring, a movement connected with said spring, a watertight case surmounting said body, said spring and movement being mounted in said watertight case, a disk movably mounted on the base of said body, a rod extending to and entering said watertight case whereby a locking means is provided for locking or releasing said movement when said disk is actuated.

4. In a sounding apparatus a pressure gage, a watertight pressure gage case, a body provided with a longitudinal opening, a movable disk a rod attached to said movable disk extending from within said pressure gage case to and through said longitudinal opening to and through said disk, and means for locking the movement of said pressure gage when the disk and rod are pushed upward, said body being provided with a series of radial openings communicating with said longitudinal opening for the ingress and egress of water to and through said body.

Signed at Sellersville in the county of Bucks and State of Pennsylvania this 24th day of January A. D. 1910.

FREDERICK SCHUBERT.

Witnesses:
HENRY T. WILLIAMS,
ALFRED E. FRETZ.

---

Copies of this patent may be obtained for five cents each, by addressing the "Commissioner of Patents, Washington, D. C."